March 6, 1962 E. A. PENCE 3,024,440

UNDERWATER TARGET

Filed May 28, 1959

INVENTOR.
ELBERT A. PENCE

BY

ATTORNEYS

3,024,440
Patented Mar. 6, 1962

3,024,440
UNDERWATER TARGET
Elbert A. Pence, Seattle, Wash., assignor, by mesne assignments, to the United States of America as represented by the Secretary of the Navy
Filed May 28, 1959, Ser. No. 816,657
2 Claims. (Cl. 340—4)

This invention relates to underwater target simulator apparatus and more particularly to improvements in their submerged transducer supporting components.

In the various tests of a torpedo it is common practice to effect a test run under its own power with suitable instrumentation within the torpedo which records running characteristics and also with external instrumentation which may record course, velocity and other characteristics. When the test involves determining the effectiveness of a torpedo to home on an underwater target, such as a submarine, a target simulator is often employed which projects acoustic energy like that of a submarine target and receives acoustic echoes from the attacking torpedo. The functions of the sound or acoustic energy projector and the echo receiving device or hydrophone may be performed by individual or combined devices, depending upon their types, but for purposes of the description of this invention such projector and hydrophone will be considered as any apparatus for this combined purpose and will hereinafter be referred to as a transducer.

Since positioning of the patterns of projecting and receiving sound waves in water of a directional transducer are effected by the orientation of the transducer in the water it is apparent that the results recorded by instrumentation will vary and hence be unreliable if the transducer does not remain in a fixed position in the water during a torpedo test run. To maintain a fixed position of a transducer on a fixed torpedo test range presents no great difficulty as exemplified by Patent 2,807,164 wherein a plurality of hydrophones are disposed along such a range. Problems are encountered, however, when an attempt is made to suspend a transducer from a buoy or boat anchored in a current of water since the transducer will tend to stream or move away from the vertical and follow the current. Similarly, if the transducer is being towed in still water it will stream rearwardly of the direction of tow. Thus, the problem of the transducer is similar in both cases and the extent of orientation away from the vertical becomes a function of the relative velocity of the water with respect to the suspended transducer. This effect is exemplified by patent application of Robert E. Francois for Underwater Target Simulator, Serial No. 801,979, filed March 25, 1959. In such application, if the buoy or ship which suspends the transducer is anchored in a current the transducer will seek a position of equilibrium in the current at a position away from the vertical. As will be apparent, the greater the velocity of the current, the greater will be the displacement from the vertical with its attendant effects on the sound projecting and echo receiving patterns. From the foregoing considerations it becomes apparent that if optimum test results are to be achieved it would be desirable to maintain the suspended transducer in vertical position irrespective of relative movement between it and the water to thereby effect uniform and unchanging sound projecting and receiving patterns.

The principal object of this invention is to provide a transducer device which will obviate the disadvantages, aforesaid, and remain in a vertical position at all times.

Further objects, advantages, and salient features will become more apparent from the description to follow, the appended claims and the accompanying drawing in which:

Figures 3, 4, 5:
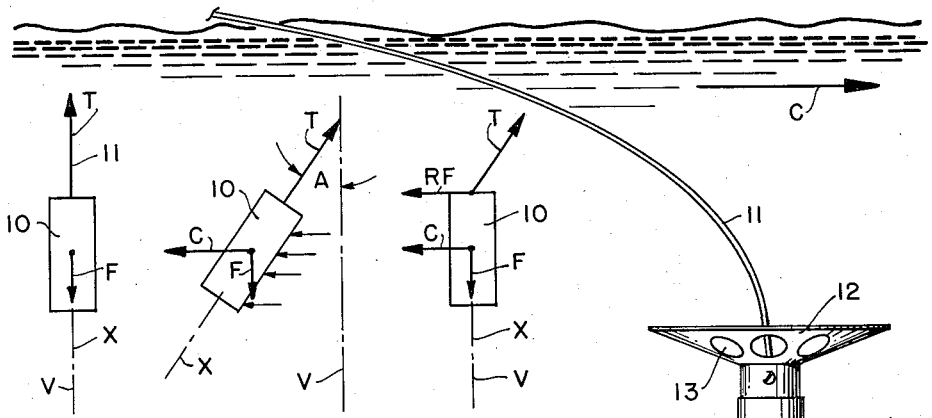
FIGS. 3, 4 and 5 diagrammatically illustrate the problem which the invention solves.

Referring to FIGS. 3, 4 and 5, and first to FIG. 3, it will be apparent that if a non-buoyant weight 10, assumed for simplicity to be a solid cylinder, is suspended by a flexible cable 11 from a fixed buoy or ship on the surface of the water, its longitudinal axis X will coincide with a vertical axis V if there is no water current; and its downward negative buoyant force F will be equal and opposite to the tension T in the cable. If water current drag forces are now applied to weight 10, illustrated as a resultant force C, FIG. 4, the weight will swing through an angle A away from the vertical axis and the now three forces F, C and T will form a force vector triangle which will maintain the weight in the position shown. As will be apparent, the acoustic projection and receiving pattern of a transducer forming a part of weight 10 will now be bodily distorted through angle A away from its original position. Referring now to FIG. 5 it will be apparent that if a suitable righting force RF is applied to the arrangement as shown in FIG. 4 at some point above the center of mass of weight 10 it will restore axis X to coincide with vertical axis V and the acoustic projecting and receiving pattern will be restored to the position of FIG. 3. The manner in which the restoring force RF is applied to weight W constitutes the principal feature of this invention which will now be described.

Figure 1:
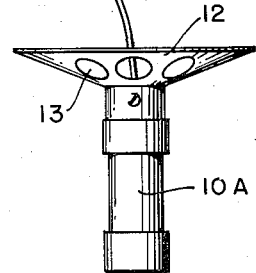
FIG. 1 is a side elevation of the invention, in its broader aspect, suspended in a water current.

FIG. 1 illustrates a device 10A suspended by a cable 11, analogous to the parts of the aforesaid description of FIGS. 3, 4 and 5 but differing in that a dish shaped or frusto-conical member 12 is attached to the upper end of the device. Water of current C now contacts the upstream lower surface of member 12 at one side producing an upward component of force and also contacts the downstream upper surface at the opposite side producing a like force but having a downward component. Since these two component forces are substantially equal and opposite in magnitude and are applied at equal distances from the vertical axis of device 10A they produce a righting torque which maintains the device in a vertical position. As will be apparent, this position will be maintained irrespective of the direction of the current since member 12 is circular and hence regardless of its orientation about a vertical axis the righting torque will remain the same because of its geometric symmetry.

The foregoing description and explanations have assumed that member 12 is imperforate. It has been found, however, that improved results are obtained by providing it with equal sized, equi-angularly spaced apertures 13 which permit water to flow through same. Since the rim portion of member 12, the generally annular portion between its outer periphery and the apertures, is at a greater radius from the vertical axis than the inner portions of the member it will be apparent that due to the relatively greater area and increased radius, this rim portion will produce the major portion of the righting torque. Thus, the perforations detract little from the righting torque and serve the purpose of permitting water to flow through the upstream apertures to more effectively impinge on the upper and opposite downstream surface thus balancing in magnitude the two vertical components of force and producing a force couple which has no effect in tending to bodily move the device in either an upward or downward direction. An additional but secondary advantage of the apertures is to permit water to readily spill through same and thereby reduce drag, particularly when the device is being reeled or otherwise retrieved to the surface of the water.

Figure 2:
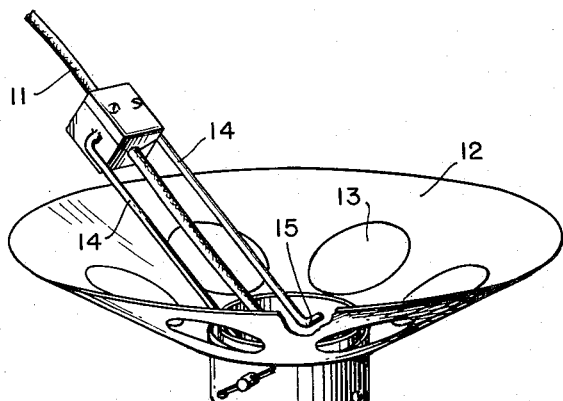
FIG. 2 is a perspective of a device similar to FIG. 1 with certain refinements.

FIG. 2 illustrates certain refinements of the invention previously described in its broader aspects. Member 12, with its perforations is of the same construction shown in FIG. 1. Rather than depend upon the flexibility of cable 11 to provide a pivotal axis at or adjacent to the upper end of the device, a positive pivotal axis is provided by securing cable 11 to a generally U-shaped bail 14 having lower outwardly and oppositely projecting ends 15 which pivotally engage the device. For optimum results with a minimum size of member 12 it has been found, and it can be shown mathematically, that the pivotal axis of the bail should be low, that is somewhat below the lower end of member 12 but above the center of mass of the entire device. Upon casual consideration it might appear that the axis of the bail would orient itself to a fixed position in space and prevent the righting torque to act about this axis. The cable, however, is flexible and may twist to permit the device to bodily rotate about a vertical axis to a position of equilibrium in which the torque or couple is applied about the bail axis.

Another refinement of the invention illustrated in FIG. 2 is a split ring weight 16 secured together by suitable screws which may be removed and replaced with other similar weights to thus establish a desired center of gravity along the vertical axis of the device and also adjust the value of force F.

The transducer 17 is removably secured to the lower end of the device and may be of any desired shape or type. It is illustrated, however, as of substantially spherical shape to thus produce a pattern in which sonic energy is projected to and received from all directions except in its upper portion where it is attached to the device. This portion produces a "notch" in the pattern which is not objectionable so long as it remains fixed in space, which function vertical maintenance of the attains. An open cage 18 generally surrounds the transducer to protect it from damage by unauthorized impact with objects.

In the operation of the invention the simulator device is lowered to a desired depth in the water from a fixed buoy or boat, or alternately, towed in the water to produce relative movement of the water with respect to the simulator device. Suitable apparatus disposed in the buoy or boat and electrically connected to the transducer through cable 11 projects pulsed sonic energy by the transducer which also receives the echo from an approaching torpedo. Suitable instrumentation disposed in the buoy or boat records the torpedo approach and provides a record of the miss distance between the torpedo and the simulator device which is the desired record of the homing efficiency of the torpedo to its target. As will be apparent, the device is equally useful in tests wherein there is no current or relative movement between the water and the device and thus serves the function of other simulator devices which remain in a fixed vertical position under such conditions. Since it may also remain vertical when subjected to current conditions it becomes apparent that the increased utility renders it adaptable under all conditions.

Obviously many modifications and variations of the present invention are possible in the light of the above teachings. It is therefore to be understood that within the scope of the appended claims the invention may be practiced otherwise than as specifically described.

What is claimed is:

1. In an underwater target adapted to be suspended by a flexible cable from an object on the surface of the water and having a transducer electrically connected through the cable to instrumentation carried by said object for recording the miss distance of a torpedo directed at the target, there being relative motion between the target and the water, whereby a vertical reference axis of the target tends to move away from a vertical axis, the improvements in combination with said target, comprising; means carried by said target and subjected to hydrodynamic forces constructed and arranged to produce a torque on said target and counteract the tendency of said vertical reference axis to move away from said vertical axis, whereby said vertical reference axis remains substantially coincident with said vertical axis.

2. Apparatus in accordance with claim 1 wherein said means comprises a circular upwardly dish shaped member affixed to the upper end of said target and above its center of mass, the upper edge of said member adapted to remain in a horizontal plane and the member having equi-angularly spaced apertures therein of substantially the same size adapted to permit water to flow through same and impinge on the downstream upper surface of same to produce a downward component of force equal and opposite to the force produced by impingement of water on its upstream lower face, thereby applying said torque.

References Cited in the file of this patent

UNITED STATES PATENTS

| | | |
|---|---|---|
| 1,299,186 | Imaizumi | Apr. 1, 1919 |
| 1,840,324 | Lindquist | Jan. 12, 1932 |
| 1,847,551 | Brayman et al. | Mar. 1, 1932 |
| 2,019,497 | Kuntze | Nov. 5, 1935 |
| 2,568,680 | Frowe | Sept. 18, 1951 |
| 2,572,255 | Gallaway | Oct. 23, 1951 |
| 2,832,944 | Kessler | Apr. 29, 1958 |